United States Patent
Ishiwatari

(10) Patent No.: US 8,240,298 B2
(45) Date of Patent: Aug. 14, 2012

(54) ABNORMALITY DIAGNOSIS APPARATUS FOR SECONDARY AIR SUPPLY ASSEMBLY OF INTERNAL COMBUSTION ENGINE

(75) Inventor: Yuji Ishiwatari, Kariya (JP)

(73) Assignee: Denso Corporation, Kariya (JP)

( * ) Notice: Subject to any disclaimer, the term of this patent is extended or adjusted under 35 U.S.C. 154(b) by 410 days.

(21) Appl. No.: 12/698,273

(22) Filed: Feb. 2, 2010

(65) Prior Publication Data

US 2010/0192929 A1      Aug. 5, 2010

(30) Foreign Application Priority Data

Feb. 2, 2009     (JP) .................................... 2009-22036

(51) Int. Cl.
*F01N 3/05*     (2006.01)
(52) U.S. Cl. .......................................... 123/674; 60/289
(58) Field of Classification Search .................. 123/634; 60/274, 276, 277, 285, 289, 293
See application file for complete search history.

(56) References Cited

U.S. PATENT DOCUMENTS

| | | | |
|---|---|---|---|
| 5,333,446 A | 8/1994 | Itoh | |
| 6,032,088 A | 2/2000 | Feldmann et al. | |
| 6,830,043 B2 | 12/2004 | Morinaga et al. | |
| 6,837,232 B2 | 1/2005 | Yamashita | |
| 6,918,245 B2 | 7/2005 | Hirooka et al. | |
| 7,073,323 B2 | 7/2006 | Hirooka et al. | |
| 7,284,369 B2 | 10/2007 | Nakano et al. | |
| 7,293,406 B2 * | 11/2007 | Lewis et al. | 60/284 |
| 2003/0061805 A1 * | 4/2003 | Hirooka et al. | 60/289 |

FOREIGN PATENT DOCUMENTS

| | | |
|---|---|---|
| JP | 05-179936 | 7/1993 |
| JP | 06-093909 | 4/1994 |
| JP | 06-117235 | 4/1994 |
| JP | 2001-152930 | 6/2001 |

* cited by examiner

*Primary Examiner* — Erick Solis
(74) *Attorney, Agent, or Firm* — Nixon & Vanderhye PC

(57) ABSTRACT

An abnormality diagnosis apparatus for diagnosing abnormality of a secondary air supply assembly includes an abnormality diagnosing unit, an air-fuel ratio learning/correcting unit, a learning degree computing unit, and a prohibition unit. The abnormality diagnosing unit diagnoses abnormality of the secondary air supply assembly based on an output of the air-fuel ratio detecting unit. The air-fuel ratio learning/correcting unit learns variation of an air-fuel ratio control system of the engine and corrects variation of an air-fuel ratio based on a result of learning the variation of the air-fuel ratio control system. The learning degree computing unit computes a learning degree, by which the air-fuel ratio learning/correcting unit learns the variation of the air-fuel ratio control system. The prohibition unit prohibits the abnormality diagnosis or makes a diagnostic result invalid when the learning degree is equal to or less than a predetermined value.

6 Claims, 6 Drawing Sheets

ABNORMALITY DIAGNOSIS APPARATUS FOR SECONDARY AIR SUPPLY ASSEMBLY OF INTERNAL COMBUSTION ENGINE

CROSS REFERENCE TO RELATED APPLICATION

This application is based on and incorporates herein by reference Japanese Patent Application No. 2009-22036 filed on Feb. 2, 2009.

BACKGROUND OF THE INVENTION

1. Field of the Invention

The present invention relates to an abnormality diagnosis apparatus for a secondary air supply assembly for an internal combustion engine, wherein the secondary air supply assembly supplies secondary air to an exhaust gas passage of the internal combustion engine in order to quickly warm up a catalytic converter.

2. Description of Related Art

For example, as known in JP-A-2003-83048 and JP-A-2004-11585, air pump supplies secondary air to an exhaust pipe of the internal combustion engine at a specific position in order to purify HC or CO in exhaust gas (oxidation reaction) or in order to facilitate the warming up of a catalytic converter by the heat of reaction. In the above, the specific position may be a position within the exhaust pipe upstream of the catalytic converter that purifies exhaust gas.

When the secondary air supply assembly has failure, quality of emission of exhaust gas deteriorates. Thus, in JP-A-2003-83048 and JP-A-2004-11585, a pressure sensor is provided to the secondary air supply pipe, and abnormality diagnosis of the secondary air supply assembly is executed based on pressure of secondary air detected by the pressure sensor.

However, cost is increased disadvantageously in the above configuration, because there is needed to provide the pressure sensor in the secondary air supply pipe.

Thus, as described in JP-A-2004-204715, a secondary air flow amount is computed based on an output of an air-fuel ratio sensor that is provided at a specific position within the exhaust pipe of the internal combustion engine. For example, the air-fuel ratio sensor is provided at a position within the exhaust pipe downstream of a secondary air supply hole, through which secondary air is supplied into the exhaust pipe. Then, abnormality diagnosis of the secondary air supply assembly is executed based on the secondary air flow amount.

For example, a recent electronically controlled internal combustion engine is operated under an air-fuel ratio feed-back control, where fuel injection quantity is feed-back corrected based on the output of the air-fuel ratio sensor such that an air-fuel ratio estimated based on exhaust gas becomes a target air-fuel ratio. However, the air-fuel ratio may vary due to the variation of performance of an air-fuel ratio control system (for example, variation of the output of the air-fuel ratio sensor caused by manufacturing variation or aging of the air-fuel ratio sensor, variation of a fuel injection quantity caused by manufacturing variation or aging of a fuel injection valve). Thus, the above variation of the air-fuel ratio control system is learned based on an air-fuel ratio feed-back correction amount, and the fuel injection quantity and the output of the air-fuel ratio sensor are corrected based on the learning result. Thereby it is possible to correct the variation of the air-fuel ratio caused by the variation of the air-fuel ratio control system.

In the above system, the learned value of variation of the air-fuel ratio control system is stored in a back-up RAM in general. Typically, the back-up RAM is a rewritable memory that keeps stored data using an on-board battery as a back-up power source while a power source of the control circuit is off. The learned value of variation of the air-fuel ratio control system is updated every time a predetermined learning execution condition is satisfied and the variation of the air-fuel ratio control system is learned. Thus, a learning accuracy (accuracy in the learned value) of the variation of the air-fuel ratio control system is improved, and thereby the accuracy in the correction of the variation of the air-fuel ratio is improved.

However, in a case immediately after the connection of the system with the on-board battery (for example, a case immediately after the manufacture of the vehicle, or after the replacement of the on-board battery), the learned value of variation of the air-fuel ratio control system has not been stored in the back-up RAM. As a result, the learned value of variation of the air-fuel ratio control system requires to be computed by updating an initial value. Thus, while a learning count (in other words, the number of times of update) of variation of the air-fuel ratio control system counted since a time, at which the ECU 30 is connected with the on-board battery, is substantially small, the learning accuracy of variation of the air-fuel ratio control system may be insufficient, and thereby variation of the air-fuel ratio caused by variation of the air-fuel ratio control system may not be accurately corrected. In the above case, the output of the air-fuel ratio sensor may include influence of variation of the air-fuel ratio control system. As a result, when abnormality diagnosis of the secondary air supply assembly using the output of the air-fuel ratio sensor is executed as described in JP-A-2004-204715, variation of the air-fuel ratio control system may influence the determination of abnormality of the secondary air supply assembly, and may cause erroneous determination.

SUMMARY OF THE INVENTION

The present invention is made in view of the above disadvantages. Thus, it is an objective of the present invention to address at least one of the above disadvantages.

To achieve the objective of the present invention, there is provided an abnormality diagnosis apparatus for diagnosing abnormality of a secondary air supply assembly for an internal combustion engine of a vehicle that has an on-board battery, wherein an air-fuel ratio detecting unit is provided to an exhaust gas passage of the internal combustion engine to detect an air-fuel ratio based on exhaust gas, and the secondary air supply assembly supplies secondary air to the exhaust gas passage at a position upstream of the air-fuel ratio detecting unit, the abnormality diagnosis apparatus including an abnormality diagnosing unit, an air-fuel ratio learning/correcting unit, a learning degree computing unit, and a prohibition unit. The abnormality diagnosing unit diagnoses abnormality of the secondary air supply assembly based on an output of the air-fuel ratio detecting unit. The air-fuel ratio learning/correcting unit learns variation of an air-fuel ratio control system of the internal combustion engine and corrects variation of an air-fuel ratio based on a result of learning the variation of the air-fuel ratio control system. The learning degree computing unit computes a learning degree, by which the air-fuel ratio learning/correcting unit learns the variation of the air-fuel ratio control system. The prohibition unit prohibits the abnormality diagnosing unit from diagnosing the abnormality of the secondary air supply assembly or makes a diagnostic result by the abnormality diagnosing unit invalid when the learning degree computed by the learning degree computing unit is equal to or less than a predetermined value.

To achieve the objective of the present invention, there is also provided an abnormality diagnosis apparatus for diagnosing abnormality of a secondary air supply assembly for an internal combustion engine, wherein an air-fuel ratio detecting unit is provided to an exhaust gas passage of the internal combustion engine to detect an air-fuel ratio based on exhaust gas, and the secondary air supply assembly supplies secondary air to the exhaust gas passage at a position upstream of the air-fuel ratio detecting unit, the abnormality diagnosis apparatus including an abnormality diagnosing unit, an air-fuel ratio learning/correcting unit, a learning degree computing unit, and a prohibition unit. The abnormality diagnosing unit diagnoses abnormality of the secondary air supply assembly based on an output of the air-fuel ratio detecting unit, wherein the output corresponds to the air-fuel ratio detected by the air-fuel ratio detecting unit. The air-fuel ratio learning/correcting unit learns an error of the output of the air-fuel ratio detecting unit, wherein the air-fuel ratio learning/correcting unit corrects the error of the output of the air-fuel ratio detecting unit based on a result of learning the error of the output of the air-fuel ratio detecting unit. The learning degree computing unit computes a learning degree, by which the air-fuel ratio learning/correcting unit learns the error of the output of the air-fuel ratio detecting unit. The prohibition unit prohibits the abnormality diagnosing unit from diagnosing the abnormality of the secondary air supply assembly or makes a diagnostic result by the abnormality diagnosing unit invalid when the learning degree computed by the learning degree computing unit is equal to or less than a predetermined value.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF PREFERRED EMBODIMENTS

Figure 1:
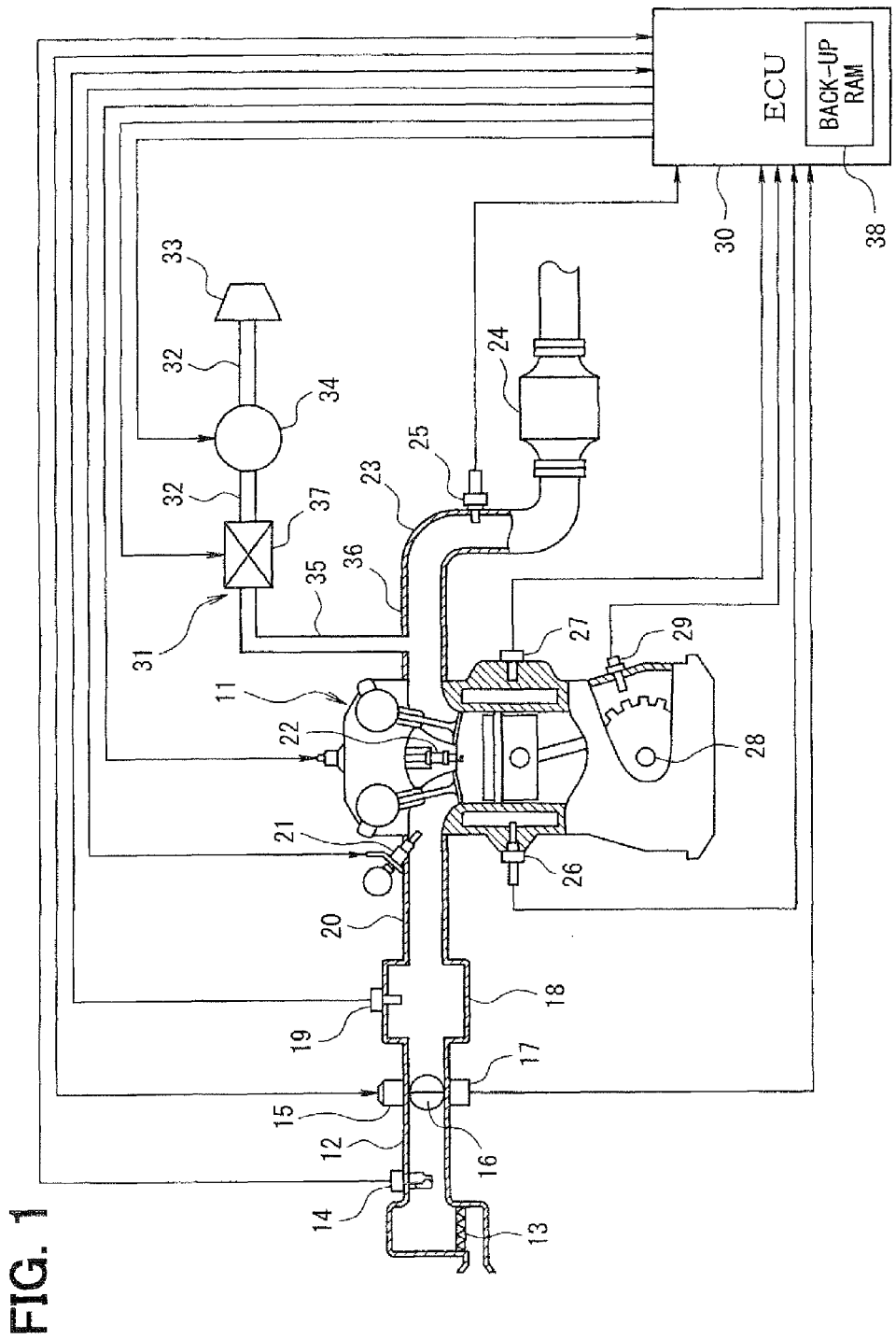
FIG. 1 is a schematic configuration generally illustrating of an engine control system of the first embodiment of the present invention.

Multiple embodiments of the present invention will be described below.
(First Embodiment)

The first embodiment of the present invention will be described with reference to FIGS. 1 to 6. Firstly, a schematic configuration of a general engine control system will be described based on FIG. 1.

There are provided an air cleaner 13, an air flow meter 14, a motor 15, a throttle valve 16, a throttle opening sensor 17, a surge tank 18, and an intake pipe pressure sensor 19 on a side upstream of an engine 11 that serves as an internal combustion engine. More specifically, the air cleaner 13 is provided at an upstream end of an intake pipe 12 of the engine 11. The air flow meter 14 is provided downstream of the air cleaner 13 and detects an intake air amount. The throttle valve 16 and the throttle opening sensor 17 are provided downstream of the air flow meter 14. The motor 15 adjusts an opening of the throttle valve 16, and the throttle opening sensor 17 detects an opening (throttle opening) of the throttle valve 16.

Furthermore, the surge tank 18 is provided downstream of the throttle valve 16. The intake pipe pressure sensor 19 is provided to the surge tank 18 and detects an intake pipe pressure. Also, the surge tank 18 is provided with an intake manifold 20 that introduces air to each cylinder of the engine 11, and a fuel injection valve 21 is provided adjacent an intake port of the intake manifold 20 of the corresponding cylinder such that the fuel injection valve 21 injects fuel into the intake pipe 12. Also, an ignition plug 22 is provided to each cylinder of a cylinder head of the engine 11, and each ignition plug 22 provides spark discharge to ignite air-fuel mixture in the cylinder. A catalytic converter 24 is provided within an exhaust pipe 23 (exhaust gas passage) of the engine 11 for purifying exhaust gas. The catalytic converter 24 may be a three-way catalytic converter, and an air-fuel ratio sensor 25 (air-fuel ratio detecting means) is provided upstream of the catalytic converter 24 for detecting an air-fuel ratio estimated based on exhaust gas.

Also, a coolant temperature sensor 26 and a knock sensor 27 are provided to a cylinder block of the engine 11. The coolant temperature sensor 26 detects temperature of coolant, and the knock sensor 27 detects knock vibration. Also, a crank angle sensor 29 is provided at a position radially outward of a crankshaft 28 for outputting a pulse signal for rotation of the crankshaft 28 by a predetermined crank angle. Thus, a crank angle and an engine rotation speed are detected based on the output signals by the crank angle sensor 29.

Next, a secondary air supply assembly 31 will be described. The secondary air supply assembly 31 is provided to supply secondary air to the exhaust pipe 23 at a position upstream of an air-fuel ratio sensor 25. An air filter 33 is provided at a position upstream end of a secondary air piping 32. An air pump 34 is provided downstream of the air filter 33, and is driven by an electric motor. Secondary air discharged from the air pump 34 is distributed through the secondary air piping 32 to a secondary air supply nozzle 35 of each cylinder, and thereby secondary air is distributed to an exhaust gas manifold 36 (exhaust gas passage) of each cylinder. Also, a control valve 37 is provided to the secondary air piping 32 for opening and closing the secondary air piping 32.

A control circuit (ECU) 30 receives the outputs of the above various sensors. The ECU 30 is mainly made of a microcomputer, and controls a fuel injection quantity of the fuel injection valves 21 and ignition timing of the ignition plugs 22 in accordance with an engine operational state by executing various engine control programs stored in an internal ROM (storage medium).

In the above operation, when a predetermined air-fuel ratio F/B (feed-back) control execution condition is satisfied, the ECU 30 computes an air-fuel ratio FIB correction coefficient based on the output of the air-fuel ratio sensor 25 such that the air-fuel ratio of exhaust gas becomes a target air-fuel ratio. Then, the ECU 30 uses the computed air-fuel ratio F/B correction coefficient to execute air-fuel ratio F/B control for correcting the fuel injection quantity.

Figure 2:
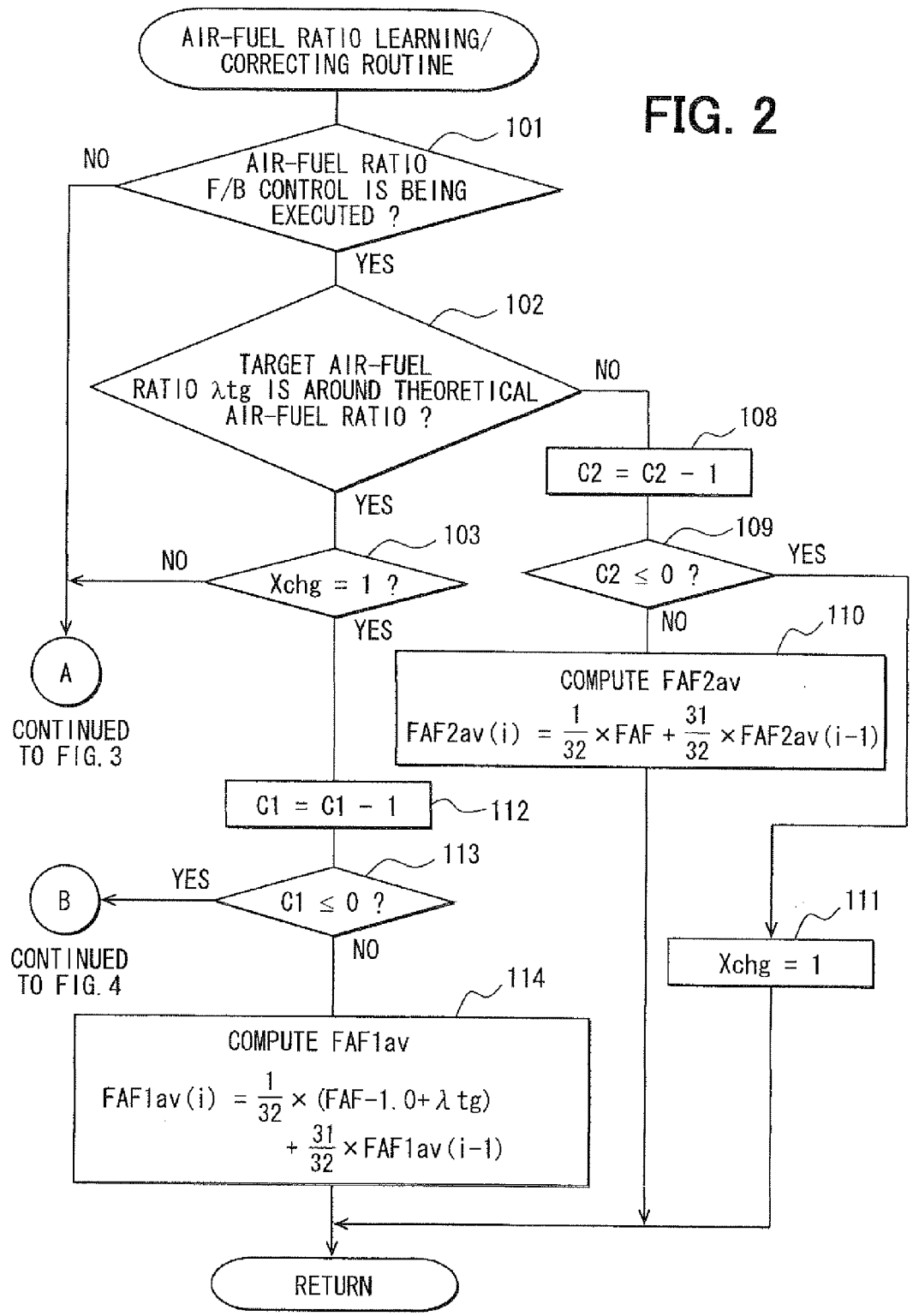
FIG. 2 is a flow chart for explaining of a procedure of an air-fuel ratio learning/correcting routine according to the first embodiment.
Figure 3:
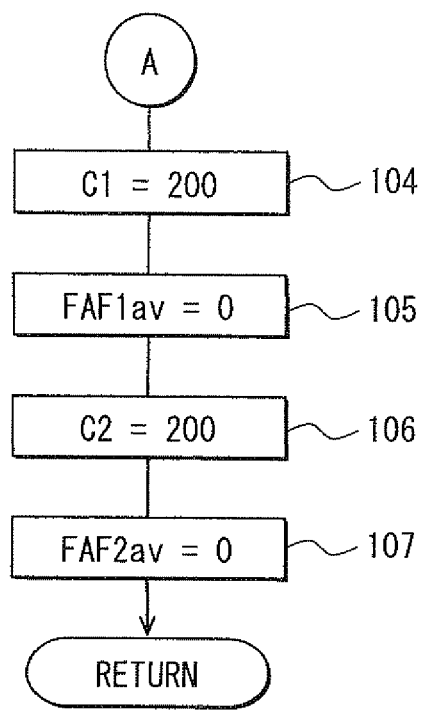
FIG. 3 is a flow chart continued from the flow chart of FIG. 2 for explaining of a procedure of an air-fuel ratio learning/correcting routine according to the first embodiment.
Figure 4:
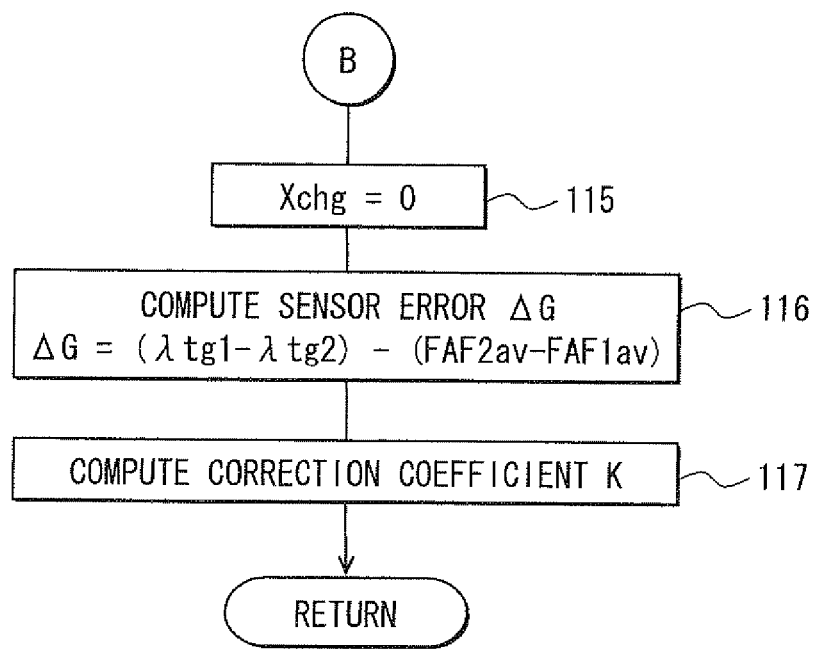
FIG. 4 is another flow chart continued from the flow chart of FIG. 2 for explaining of a procedure of an air-fuel ratio learning/correcting routine according to the first embodiment.

Furthermore, the ECU 30 also executes an air-fuel ratio learning/correcting routine shown in FIGS. 2 to 4. In the air-fuel ratio learning/correcting routine, for example, the ECU 30 learns an error (sensor error) of the output of the air-fuel ratio sensor 25 based on the air-fuel ratio F/B correction coefficient during the executing of the air-fuel ratio F/B control. The ECU 30 learns the sensor error as information indicating variation of the air-fuel ratio control system. The learned value of the variation of the air-fuel ratio control system (for example, the learned value of the sensor error) is stored in a back-up RAM 38 of the ECU 30. The back-up RAM 38 serves as a rewritable memory that keeps stored data by using an on-board battery as a back-up power source during a power source of the ECU 30 is off. The ECU 30 corrects the output of the air-fuel ratio sensor 25 based on the learned value of the variation of the air-fuel ratio control system in order to correct variation of the air-fuel ratio caused by the variation of the air-fuel ratio control system.

Also, when a predetermined secondary air supply control execution condition is satisfied, the ECU 30 executes a secondary air supply control routine (not shown) to turn on the air pump 34, and opens the control valve 37 in order to start secondary air supply control for supplying secondary air to the exhaust pipe 23. When the secondary air supply control execution condition becomes dissatisfied or when a predetermined secondary air supply period has elapsed, the ECU 30 turns off the air pump 34 and closes the control valve 37 in order to stop the supply of secondary air.

Figure 5:
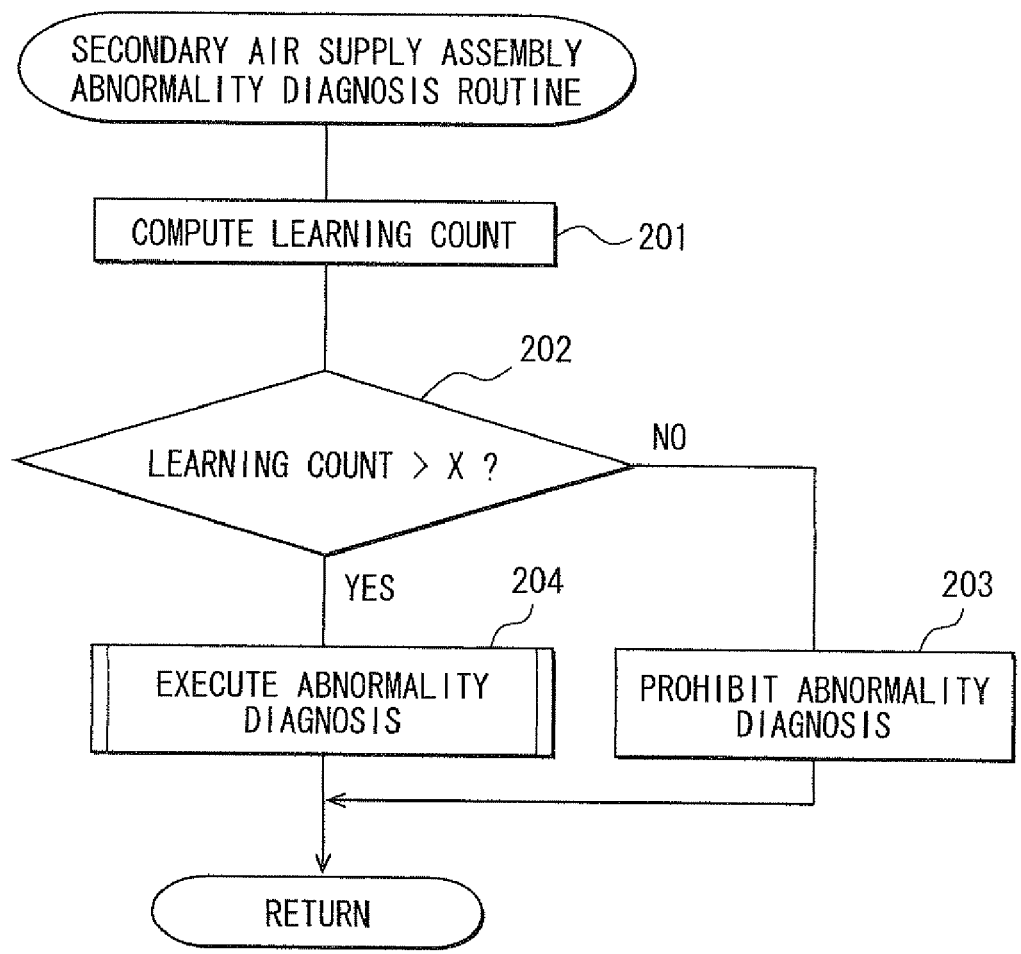
FIG. 5 is a flow chart for explaining a procedure of a secondary air supply assembly abnormality diagnosis main routine according to the first embodiment.
Figure 6:
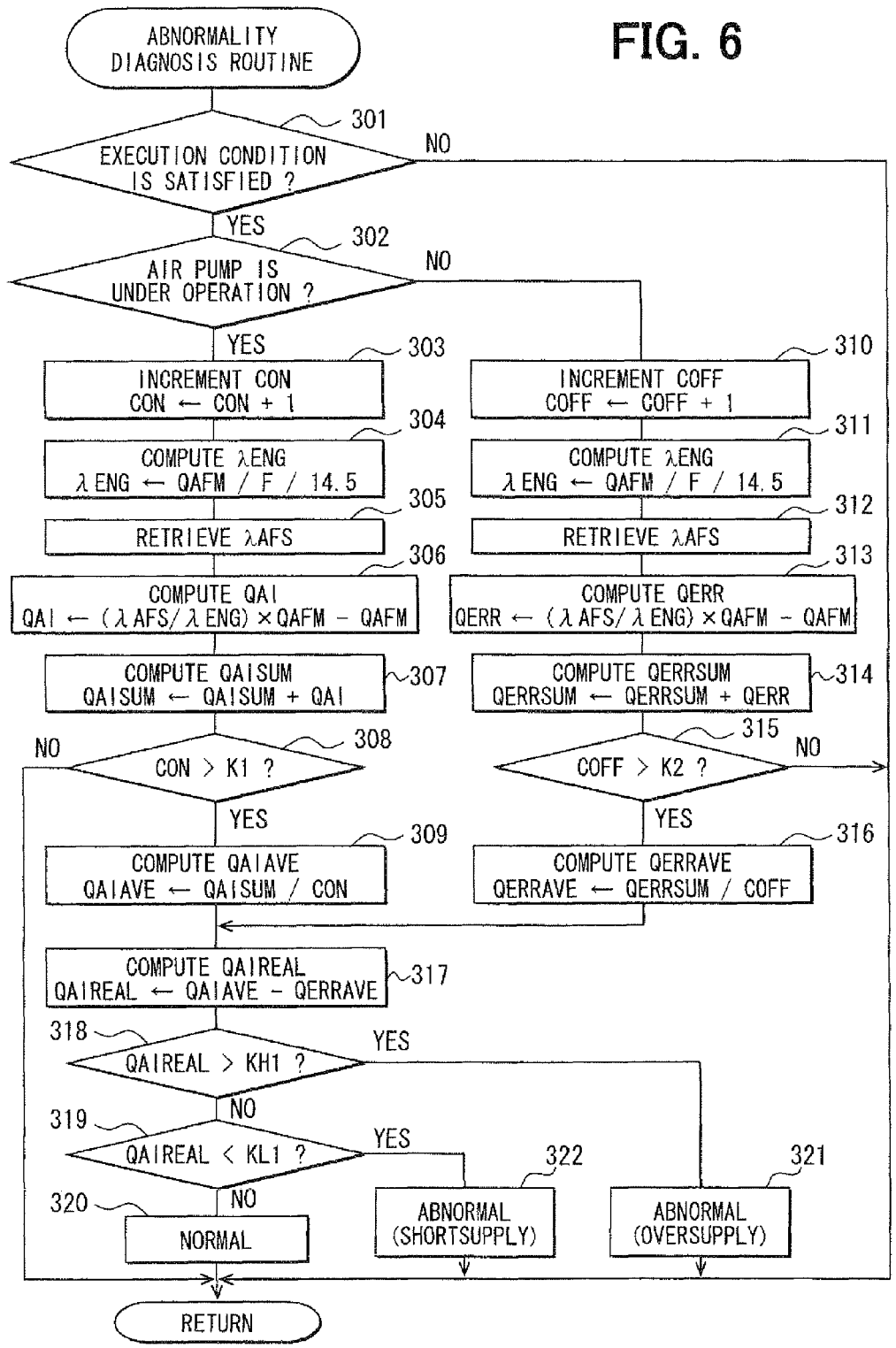
FIG. 6 is a flow chart for explaining a procedure of an abnormality diagnosis routine of the first embodiment.

Furthermore, the ECU 30 executes routines shown in FIG. 5 and FIG. 6 for a secondary air supply assembly abnormality diagnosis in order to executes abnormality diagnosis. More specifically, when a predetermined abnormality diagnosis execution condition is satisfied, the ECU 30 executes the abnormality diagnosis, in which the ECU 30 computes a secondary air flow amount based on the output of the air-fuel ratio sensor 25. Then, the ECU 30 determines whether there is abnormality of the secondary air supply assembly 31 based on the secondary air flow amount.

However, in a case immediately after the connection of the ECU 30 with the on-board battery (for example, a case immediately after the manufacture of a vehicle or after the replacement of the on-board battery), the back-up RAM 38 does not store the learned value of the variation of the air-fuel ratio control system (for example, the learned value of the sensor error). As a result, the learned value of the variation of the air-fuel ratio control system requires to be computed by updating an initial value. Thus, while a learning count of the variation of the air-fuel ratio control system after the connection with the on-board battery is small, a learning accuracy of the variation of the air-fuel ratio control system is not substantially good. In other words, while the number of times of learning or updating the sensor error counted since a time, at which the ECU 30 is connected with the on-board battery, is small, an accuracy of the learned value of the sensor error is estimated to be insufficient. Thereby, the correction of the variation of the air-fuel ratio caused by the variation of the air-fuel ratio control system may not be accurately executed. In the above case, the variation of the air-fuel ratio control system influences the output of the air-fuel ratio sensor 25. As a result, when abnormality diagnosis of the secondary air supply assembly 31 is executed with the output of the air-fuel ratio sensor 25, abnormality of the secondary air supply assembly 31 may be erroneously determined because of the influence of the unwanted variation of the performance of the air-fuel ratio control system, for example.

In order to deal with the above disadvantages in the conventional art, in the first embodiment of the present embodiment, a learning degree of the variation of the air-fuel ratio control system is determined as below. Firstly, the learning count of the variation of the air-fuel ratio control system since the time of the connection with the on-board battery is computed. When the computed learning count of the variation of the air-fuel ratio control system is equal to or smaller than a predetermined number of times, it is estimated that the learning count of the variation of the air-fuel ratio control system is small or insufficient. In other words, when the learning count is equal to or smaller than the predetermined number of times, it is estimated that the number of updating the learned value is insufficient. As a result, it is estimated that the learning accuracy of the variation of the air-fuel ratio control system is insufficient, and thereby it is estimated that the variation of the air-fuel ratio caused by the variation of the air-fuel ratio control system may not be accurately corrected. Thus, the abnormality diagnosis of the secondary air supply assembly 31 with the output of the air-fuel ratio sensor 25 is prohibited accordingly.

Each of routines shown in FIGS. 2 to 6 executed by the ECU 30 will be described below.

[Air-Fuel Ratio Learning/Correcting Routine]

The air-fuel ratio learning/correcting routine shown in FIG. 2 to FIG. 4 is repeatedly executed by predetermined intervals while the power source of the ECU 30 is on, and corresponds to air-fuel ratio learning/correcting means. In general, an excess air factor (lambda $\lambda$) is computed as a ratio of (a) an actual air-fuel ratio relative to (b) a theoretical air-fuel ratio as the following equation; excess air factor $\lambda$=actual air-fuel ratio/theoretical air-fuel ratio. In the present routine, the excess air factor $\lambda$ serves as information of "air-fuel ratio".

When present routine is started, it is determined at step 101 whether the air-fuel ratio F/B control is being executed. When it is determined at step 101 that the air-fuel ratio F/B control is not being executed, control proceeds to step 104 in FIG. 3, where a counter C1 is set to a predetermined value (for example, 200). For example, the counter C1 counts a computation duration for computing an average value FAF1$av$ of the air-fuel ratio F/B correction coefficient for a normal operation (while target air-fuel ratio $\lambda$tg=1.0). Then, control proceeds to step 105, where the air-fuel ratio F/B correction coefficient average value FAF1$av$ for the normal operation is reset to "0".

Subsequently, control proceeds to step 106, where a counter C2 is set to be a predetermined value (for example, 200). For example, the counter C2 counts a computation duration for computing an average value FAF2$av$ of the air-fuel ratio F/B correction coefficient for a target air-fuel ratio shift operation. Typically, the above target air-fuel ratio shift operation is executed after completion of fuel cut and indicates an operation, in which a target air-fuel ratio $\lambda$tg is temporarily shifted in a rich direction. After the counter C2 is set to be the predetermined value at step 106, control proceeds to step 107, where the air-fuel ratio F/B correction coefficient average value FAF2$av$ for the target air-fuel ratio shift operation is reset to "0", and the present routine is ended.

When it is determined at step 101 of FIG. 2 that the air-fuel ratio F/B control is being executed, control proceeds to step 102, where it is determined whether the target air-fuel ratio $\lambda$tg stays around the theoretical air-fuel ratio (for example, the target air-fuel ratio $\lambda$tg falls within a range from 0.98 to 1.01).

If the target air-fuel ratio $\lambda$tg has been set at a target air-fuel ratio $\lambda$tg1 (for example, 1.0) for the normal operation, it is determined at step 102 that the target air-fuel ratio $\lambda$tg stays around the theoretical air-fuel ratio, corresponding to "Yes" at step 102, and control proceeds to step 103. Then, it is determined at step 103 whether a target air-fuel ratio shift completion flag Xchg is set at "1". When the determination of step 103 indicates that the target air-fuel ratio shift completion flag Xchg has not yet been set at "1", control proceeds to step 104 of FIG. 3.

In contrast, when the target air-fuel ratio λtg has been set to a target air-fuel ratio λtg2 (for example, 0.96) for the target air-fuel ratio shift operation, it is determined at step 102 that the target air-fuel ratio λtg is off the theoretical air-fuel ratio, corresponding to "No" at step 102, and control proceeds to step 108. Then, the count value of the counter C2 is decremented by "1", and control proceeds to step 109, where it is determined whether the count value of the counter C2 becomes equal to or less than 0.

When it is determined at step 109 that the count value of the counter C2 is not equal to or less than 0, control proceeds to step 110, where the air-fuel ratio F/B correction coefficient average value FAF2av for the target air-fuel ratio shift operation (weighted average value) is computed based on the following equation.

$$FAF2av(i)=1/32\times FAF+31/32\times FAF2av(i-1), \text{ where:}$$

FAF2av(i) indicates an air-fuel ratio F/B correction coefficient average value of a present operation, FAF2av(i−1) indicates an air-fuel ratio F/B correction coefficient average value of a previous operation that proceeds the present operation, and FAF indicates a present air-fuel ratio F/B correction coefficient.

In contrast, when it is determined at step 109 that the counter C2 is equal to or less than 0, control proceeds to step 111, where the target air-fuel ratio shift completion flag Xchg is set at "1".

In a case, where rich control has been completed, and the target air-fuel ratio λtg is shifted back to the target air-fuel ratio λtg1 (for example, 1.0) for the normal operation, the determination results at step 102 and step 103 in FIG. 2 both correspond to "Yes", and thereby control proceeds to step 112. Then, the count value of the counter C1 is decremented by "1" at step 112, and control proceeds to step 113, where it is determined whether the count value of the counter C1 becomes equal to or less than 0.

When it is determined at step 113 that the counter C1 is not equal to or less than 0, control proceeds to step 114, where the air-fuel ratio F/B correction coefficient average value FAF1av (weighted average value) for the normal operation is computed based on the following equation.

$$FAF1av(i)=1/32\times(FAF-1.0+\lambda tg)+31/32\times FAF1av(i-1),$$
where

FAF1av(i) indicates an air-fuel ratio F/B correction coefficient average value of the present operation, FAF1av(i−1) indicates an air-fuel ratio FIB correction coefficient average value of the previous operation, and FAF indicates the present air-fuel ratio F/B correction coefficient.

In contrast, when it is determined at step 113 that the count value of the counter C1 is equal to or less than 0, control proceeds to step 115 of FIG. 4, where the target air-fuel ratio shift completion flag Xchg is reset to "0".

Then, control proceeds to step 116, where a learned value of a sensor error ΔG is computed as a difference between (a) a change amount (λtg1−λtg2) between the target air-fuel ratios and (b) a change amount (FAF2av−FAF1av) between the air-fuel ratio F/B correction coefficient average values. The learned value of the sensor error ΔG is stored in the back-up RAM 38 of the ECU 30.

$$\Delta G=(\lambda tg1-tg2)-(FAF2av-FAF1av)$$

Then, control proceeds to step 117, where a correction coefficient K is computed with a map of the correction coefficient K accordingly to the learned value of the sensor error ΔG. The ECU 30 corrects the output of the air-fuel ratio sensor 25 with the correction coefficient K in order to correct the variation of the air-fuel ratio caused by the variation of the air-fuel ratio control system.

[Secondary Air Supply Assembly Abnormality Diagnosis Main Routine]

The secondary air supply assembly abnormality diagnosis main routine shown in FIG. 5 is repeated by predetermined intervals while the power source of the ECU 30 is on. When the present routine is started, firstly, the learning count of the variation of the air-fuel ratio control system after connection with the on-board battery is computed at step 201. The process of step 201 corresponds to learning degree computing means.

Then, control proceeds to step 202, where it is determined whether the learning count of the variation of the air-fuel ratio control system after the connection with the on-board battery exceeds a predetermined number of times X. When the determination at step 202 indicates that the learning count is equal to or less than the predetermined number of times X, it is determined that the learning count is relatively small, and thereby it is estimated that the learning accuracy of the variation of the air-fuel ratio control system is insufficient. As a result, it is estimated that the variation of the air-fuel ratio caused by the variation of the air-fuel ratio control system may not be accurately corrected. Thus, control proceeds to step 203, where abnormality diagnosis of the secondary air supply assembly 31 using the output of the air-fuel ratio sensor 25 is prohibited. The process at step 203 corresponds to prohibition means.

In contrast, when it is determined at step 202 that the learning count exceeds the predetermined number of times X, control proceeds to step 204, where an abnormality diagnosis routine in FIG. 6, which will be described later, is executed. In the abnormality diagnosis routine, when a predetermined abnormality diagnosis execution condition is satisfied, abnormality diagnosis of the secondary air supply assembly 31 with the output of the air-fuel ratio sensor 25 is executed.

[Abnormality Diagnosis Routine]

The abnormality diagnosis routine shown in FIG. 6 is a subroutine at step 204 in the secondary air supply assembly abnormality diagnosis main routine shown in the FIG. 5. The abnormality diagnosis routine corresponds to abnormality diagnosing means. When the present routine is started, firstly, it is determined at step 301 whether the predetermined abnormality diagnosis execution condition is satisfied based on the following conditions (1) to (4), for example.

(1) The air-fuel ratio sensor 25 is under an activation state.
(2) The engine is operated under a steady state.
(3) The switch of the air pump 34 has been kept "on" or "off" for equal to or greater than a predetermined time period.
(4) An intake air amount QAFM is less than a predetermined amount. When all of the above conditions (1) to (4) are satisfied, the abnormality diagnosis execution condition is satisfied or established. However, when any one of the above conditions (1) to (4) is not satisfied, the abnormality diagnosis execution condition is not satisfied.

When it is determined at step 301 that the abnormality diagnosis execution condition is not satisfied, the subsequent process of the abnormality diagnosis at and after step 302 will not be executed, and the present routine is ended.

In contrast, when it is determined at step 301 that the abnormality diagnosis execution condition is satisfied, the process of the abnormality diagnosis at and after step 302 is executed as described below.

Firstly, it is determined at step 302 whether the air pump 34 is under operation. When it is determined at step 302 that the air pump 34 is under operation, it is estimated that the secondary air is being supplied, and control proceeds to step 303, where a secondary air ON continuation counter CON is incremented by "1". Then, control proceeds to step 304, where a supply air-fuel ratio λENG to the engine 11 is computed based on the following equation (1) with an intake air amount QAFM detected by the air flow meter 14 and a fuel injection quantity F.

$$\lambda ENG \leftarrow QAFM/F/14.5 \quad (1)$$

Then, control proceeds to step 305, where a secondary air downstream air-fuel ratio λAFS detected by the air-fuel ratio sensor 25 is retrieved. For example, the secondary air downstream air-fuel ratio λAFS indicates a air-fuel ratio detected downstream of a position, at which secondary air is introduced. After the retrieval of the secondary air downstream air-fuel ratio λAFS, control proceeds to step 306, where a secondary air flow amount QAI for the operation of the air pump is computed based on the following equation (2).

$$QAI \leftarrow (\lambda AFS/\lambda ENG) \times QAFM - QAFM \quad (2)$$

Then, control proceeds to step 307, where a secondary air flow amount integrated value QAISUM is computed by integrating the secondary air flow amount QAI for the operation of the air pump. After the computation of the secondary air flow amount integrated value QAISUM, control proceeds to step 308, where it is determined whether the secondary air ON continuation counter CON indicates a value greater than a predetermined value K1. When the value of the secondary air ON continuation counter CON is greater than the predetermined value K1, control proceeds to step 309, where a secondary air flow amount average value QAIAVE for the operation of the air pump is computed based on the following equation (3).

$$QAIAVE \leftarrow QAISUM/CON \quad (3)$$

In contrast, when it is determined at step 302 that the air pump 34 is not under operation, it is determined that the supply of secondary air is stopped, and control proceeds to step 310, where a secondary air OFF continuation counter COFF is incremented by "1". Then, control proceeds to step 311, where the supply air-fuel ratio λENG of the engine 11 is computed based on the above equation (1) with the intake air amount QAFM detected by the air flow meter 14 and the fuel injection quantity F.

Subsequently, control proceeds to step 312, where the secondary air downstream air-fuel ratio λAFS detected by the air-fuel ratio sensor 25 is retrieved, and then control proceeds to step 313, where a secondary air flow amount QERR for the non-operation of the air pump is computed based on the following equation (4).

$$QERR \leftarrow (\lambda AFS/\lambda ENG) \times QAFM - QAFM \quad (4)$$

Then, control proceeds to step 314, where the secondary air flow amount QERR for the non-operation of the air pump is integrated to compute a secondary air flow amount integrated value QERRSUM. Then, control proceeds to step 315, where it is determined whether the secondary air OFF continuation counter COFF indicates a value greater than a predetermined value K2. When the value of the secondary air OFF continuation counter COFF is greater than the predetermined value K2, control proceeds to step 316, where a secondary air flow amount average value QERRAVE for the non-operation of the air pump is computed based on the following equation (5).

$$QERRAVE \leftarrow QERRSUM/COFF \quad (5)$$

Then, control proceeds to step 317, where the secondary air flow amount average value QERRAVE for the non-operation of the air pump is subtracted from the secondary air flow amount average value QAIAVE for the operation of the air pump to compute a real secondary air flow amount QAIREAL.

$$QAIREAL \leftarrow QAIAVE - QERRAVE$$

Then, control proceeds to step 318, where it is determined whether the real secondary air flow amount QAIREAL is greater than a predetermined upper-limit flow amount KH1. When it is determined that the real secondary air flow amount QAIREAL is equal to or less than the upper-limit flow amount KH1, control proceeds to step 319, where it is determined whether the real secondary air flow amount QAIREAL is less than a predetermined lower-limit flow amount KL1.

When it is determined at step 318 that the real secondary air flow amount QAIREAL is equal to or less than the upper-limit flow amount KH1, and simultaneously when it is determined at step 319 that the real secondary air flow amount QAIREAL is equal to or greater than the lower-limit flow amount KL1, control proceeds to step 320, where it is determined that there is no abnormality of the secondary air supply assembly 31 or that the operation of the secondary air supply assembly 31 is normal. Thus, the present routine is ended.

In contrast, when it is determined at step 318 that the real secondary air flow amount QAIREAL is greater than the upper-limit flow amount KH1, control proceeds to step 321, where it is determined that there is abnormality indicating oversupply of the flow amount of the secondary air supply assembly 31, and then the present routine is ended.

In contrast, when it is determined at step 319 that the real secondary air flow amount QAIREAL is less than the lower-limit flow amount KL1, control proceeds to step 322, where it is determined that there is abnormality indicating shortsupply of the flow amount of the secondary air supply assembly 31, and then the present routine is ended.

In the first embodiment, the learning count, by which the variation of the air-fuel ratio control system is learned after the connection with the on-board battery, is computed. When the learning count is equal to or less than the predetermined number of times, it is estimated that the learning count is insufficient, and thereby the learning accuracy of the variation of the air-fuel ratio control system is insufficient. As a result, it is estimated that the variation of the air-fuel ratio caused by the variation of the air-fuel ratio control system may not be accurately corrected. Therefore, the abnormality diagnosis of the secondary air supply assembly 31 with the output of the air-fuel ratio sensor 25 is prohibited. As a result, erroneous determination of the abnormality of the secondary air supply assembly 31 caused by the influence of the variation of the air-fuel ratio control system is prevented advantageously, and thereby the accuracy in the abnormality diagnosis of the secondary air supply assembly 31 is effectively improved.

(Second Embodiment)

Next, the second embodiment of the present invention will be described with reference to FIG. 7. Similar components of the present embodiment, which are similar to the components of the first embodiment, will be designated by the same numerals, and the explanation thereof will be omitted. Thus, parts of the second embodiment different from the first embodiment will be mainly described.

In the first embodiment, when the learning count of the variation of the air-fuel ratio control system after the connection with the on-board battery is equal to or less than the predetermined number of times, the abnormality diagnosis of the secondary air supply assembly 31 with the output of the air-fuel ratio sensor 25 is prohibited. However, in the second embodiment, the ECU 30 executes a secondary air supply assembly abnormality diagnosis main routine shown in FIG. 7 such that a diagnostic result of the abnormality diagnosis of the secondary air supply assembly 31 is made invalid when the learning count of the variation of the air-fuel ratio control system after the connection with the on-board battery is equal to or less than the predetermined number of times.

Figure 7:
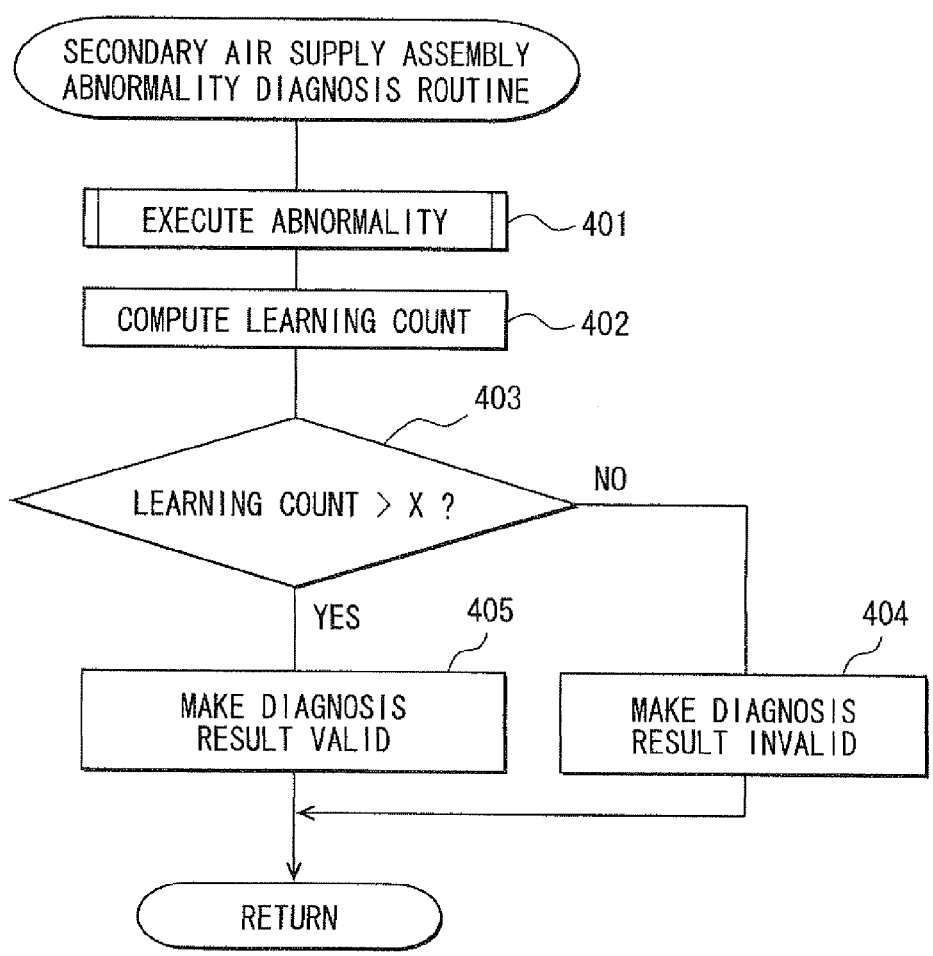
FIG. 7 is a flow chart for explaining a secondary air supply assembly abnormality diagnosis main routine according to the second embodiment of the present invention.

In the secondary air supply assembly abnormality diagnosis main routine shown in FIG. 7, firstly, the abnormality diagnosis routine shown in FIG. 6 is executed at step 401 such that the abnormality diagnosis of the secondary air supply assembly 31 with the output of the air-fuel ratio sensor 25 is executed when the predetermined abnormality diagnosis execution condition is satisfied.

Then, control proceeds to step 402, where the learning count, by which the variation of the air-fuel ratio control system is learned after the connection with the on-board battery, is computed. Subsequently, control proceeds to step 403, where it is determined whether the learning count is greater than the predetermined number of times X.

When it is determined that the learning count is equal to or less than the predetermined number of times X, it is determined that the learning count is insufficient, and thereby the learning accuracy of the variation of the air-fuel ratio control system is insufficient accordingly. As a result, it is estimated that the variation of the air-fuel ratio caused by the variation of the air-fuel ratio control system may not be accurately corrected. Thus, control proceeds to step 404, where the diagnostic result of the abnormality diagnosis of the secondary air supply assembly 31 with the output of the air-fuel ratio sensor 25 is made invalid. In other words, data indicating the diagnostic result is discarded.

In contrast, when it is determined at step 403 that the learning count is greater than the predetermined number of times X, control proceeds to step 405, where the diagnostic result of the abnormality diagnosis of the secondary air supply assembly 31 with the output of the air-fuel ratio sensor 25 is made valid. In other words, the diagnostic result is used as it is.

Advantages similar to the advantages achievable in the first embodiment are achievable in the above second embodiment.

In each of the first and second embodiments, the learning degree of the variation of the air-fuel ratio control system is computed as the learning count of the variation of the air-fuel ratio control system counted after the connection with the on-board battery. However, a parameter used for evaluating the learning degree of the variation of the air-fuel ratio control system may be changed as required. For example, the learning degree of the variation of the air-fuel ratio control system may be alternatively computed as an integrated operation time period of the engine 11 after the connection with the on-board battery. When the integrated operation time period of the engine 11 is equal to or less than a predetermined time period, it is estimated that the learning count of the variation of the air-fuel ratio control system after the connection with the on-board battery is insufficient. Thus, the abnormality diagnosis of the secondary air supply assembly 31 is prohibited, or the diagnostic result of the abnormality diagnosis of the secondary air supply assembly 31 is made invalid.

Furthermore, the learning degree of the variation of the air-fuel ratio control system may be alternatively computed as a starting count, by which the engine 11 has been started since a time of the connection with the on-board battery. When the starting count of the engine 11 is equal to or less than a predetermined number of times, it is estimated that the learning count of the variation of the air-fuel ratio control system after the connection with the on-board battery is insufficient. Thus, the abnormality diagnosis of the secondary air supply assembly 31 is prohibited or the diagnostic result of the abnormality diagnosis of the secondary air supply assembly 31 is made invalid.

Also, the learning degree of the variation of the air-fuel ratio control system may be alternatively computed as an integrated travel distance, by which the vehicle travels after the connection with the on-board battery. When the integrated travel distance is equal to or less than a predetermined distance, it is estimated that the learning count of the variation of the air-fuel ratio control system after the connection with the on-board battery is insufficient. As a result, the abnormality diagnosis of the secondary air supply assembly 31 may be prohibited, or the diagnostic result of the abnormality diagnosis of the secondary air supply assembly 31 is made invalid.

Further, the learning degree of the variation of the air-fuel ratio control system may be computed as the number of times of the fuel injection or the ignition after the connection with the on-board battery. When the above number of times is equal to or less than a predetermined number of times, it is estimated that the learning count of the variation of the air-fuel ratio control system after the connection with the on-board battery is insufficient. Thus, the abnormality diagnosis of the secondary air supply assembly 31 may be prohibited, or the diagnostic result of the abnormality diagnosis of the secondary air supply assembly 31 is made invalid.

Also, in each of the first and second embodiments, the variation of the air-fuel ratio control system is indicated by the variation (error) of the output of the air-fuel ratio sensor 25, and the above variation (error) is learned. However, the present invention is not limited to the above. For example, the variation of the air-fuel ratio control system may employ variation of any parameter that influences the air-fuel ratio, such as variation of fuel injection quantity, variation of the output of the air flow meter 14, or variation of the output of the throttle opening sensor 17, and the variation of the above parameter is learned instead of the output of the air-fuel ratio sensor 25. Still alternatively, variation of the air-fuel ratio caused by the variation of the above parameter that influences the air-fuel ratio may be learned.

Also, the configuration of the secondary air supply assembly 31 may be modified as required. A method of the abnormality diagnosis of the secondary air supply assembly 31 with the output of the air-fuel ratio sensor 25 may be modified as required. Furthermore, a method for learning the variation of the air-fuel ratio control system and a method for correcting the variation of the air-fuel ratio based on the result of learning the variation may be modified as required.

The present invention is not limited to an intake port injection engine shown in FIG. 1. However, the present invention is applicable to a cylinder injection engine or to a dual injection engine, which is provided with both a first fuel injection valve and a second fuel injection valve. The first fuel injection valve is used for intake port injection, and the second fuel injection valve is used for cylinder injection.

Additional advantages and modifications will readily occur to those skilled in the art. The invention in its broader terms is therefore not limited to the specific details, representative apparatus, and illustrative examples shown and described.

What is claimed is:

1. An abnormality diagnosis apparatus for diagnosing abnormality of a secondary air supply assembly for an internal combustion engine of a vehicle that has an on-board battery, wherein an air-fuel ratio detecting means is provided to an exhaust gas passage of the internal combustion engine to detect an air-fuel ratio based on exhaust gas, and the secondary air supply assembly supplies secondary air to the exhaust gas passage at a position upstream of the air-fuel ratio detecting means, the abnormality diagnosis apparatus comprising:

abnormality diagnosing means for diagnosing abnormality of the secondary air supply assembly based on an output of the air-fuel ratio detecting means;

air-fuel ratio learning/correcting means for learning variation of an air-fuel ratio control system of the internal combustion engine and for correcting variation of an air-fuel ratio based on a result of learning the variation of the air-fuel ratio control system;

learning degree computing means for computing a learning degree, by which the air-fuel ratio learning/correcting means learns the variation of the air-fuel ratio control system; and prohibition means for prohibiting the abnormality diagnosing means from diagnosing the abnormality of the secondary air supply assembly or for making a diagnostic result by the abnormality diagnosing means invalid when the learning degree computed by the learning degree computing means is equal to or less than a predetermined value.

2. The abnormality diagnosis apparatus according to claim 1, wherein:

the learning degree computing means includes means for computing a learning count, by which the air-fuel ratio learning/correcting means learns the variation of the air-fuel ratio control system since a time, at which the abnormality diagnosis apparatus is connected with the on-board battery; and the learning count serves as the learning degree.

3. The abnormality diagnosis apparatus according to claim 1, wherein:

the learning degree computing means includes means for computing an integrated operation time period, for which the internal combustion engine is operated since a time, at which the abnormality diagnosis apparatus is connected with the on-board battery; and the integrated operation time period serves as the learning degree.

4. The abnormality diagnosis apparatus according to claim 1, wherein:

the learning degree computing means includes means for computing a starting count, by which the internal combustion engine is started since a time, at which the abnormality diagnosis apparatus is connected with the on-board battery; and the starting count serves as the learning degree.

5. The abnormality diagnosis apparatus according to claim 1, wherein:

the learning degree computing means includes means for computing an integrated travel distance, by which the vehicle travels since a time, at which the abnormality diagnosis apparatus is connected with the on-board battery; and the integrated travel distance serves as the learning degree.

6. An abnormality diagnosis apparatus for diagnosing abnormality of a secondary air supply assembly for an internal combustion engine, wherein an air-fuel ratio detecting means is provided to an exhaust gas passage of the internal combustion engine to detect an air-fuel ratio based on exhaust gas, and the secondary air supply assembly supplies secondary air to the exhaust gas passage at a position upstream of the air-fuel ratio detecting means, the abnormality diagnosis apparatus comprising:

abnormality diagnosing means for diagnosing abnormality of the secondary air supply assembly based on an output of the air-fuel ratio detecting means, wherein the output corresponds to the air-fuel ratio detected by the air-fuel ratio detecting means;

air-fuel ratio learning/correcting means for learning an error of the output of the air-fuel ratio detecting means, wherein the air-fuel ratio learning/correcting means corrects the error of the output of the air-fuel ratio detecting means based on a result of learning the error of the output of the air-fuel ratio detecting means;

learning degree computing means for computing a learning degree, by which the air-fuel ratio learning/correcting means learns the error of the output of the air-fuel ratio detecting means; and prohibition means for prohibiting the abnormality diagnosing means from diagnosing the abnormality of the secondary air supply assembly or for making a diagnostic result by the abnormality diagnosing means invalid when the learning degree computed by the learning degree computing means is equal to or less than a predetermined value.

* * * * *